United States Patent [19]
Keller et al.

[11] 3,822,583
[45] July 9, 1974

[54] METHOD FOR DETERMINING OCTANE RATINGS OF FUELS UNDER ROAD CONDITIONS

[75] Inventors: Billy D. Keller, Valparaiso, Ind.; Irwin Ginsburgh, Morton Grove; Lawrence T. Wright, Homewood, both of Ill.

[73] Assignee: Standard Oil Company, Chicago, Ill.

[22] Filed: Nov. 30, 1972

[21] Appl. No.: 310,690

[52] U.S. Cl. .............................................. 73/35
[51] Int. Cl. ...................... G01l 23/22, G01n 33/22
[58] Field of Search ........................................ 73/35

[56] References Cited
UNITED STATES PATENTS

| | | | |
|---|---|---|---|
| 2,380,704 | 7/1945 | Morgan et al. | 73/35 |
| 2,450,882 | 10/1948 | Costa | 73/35 X |
| 2,964,939 | 12/1960 | Forrest | 73/35 |
| 3,393,557 | 7/1968 | Brown et al. | 73/35 X |

Primary Examiner—James J. Gill, Jr.
Attorney, Agent, or Firm—Reed F. Riley; Arthur G. Gilkes; William T. McClain

[57] ABSTRACT

Method and apparatus for detecting engine knock and measuring octane ratings of petroleum fuels in automotive engines and of measuring octane number requirements of said engines. Method and apparatus are herein described for maintaining a controlled knock condition in an internal combustion engine throughout a controlled acceleration of said engine by using a portion of the electrical output of at least one sensor device contacting said engine suitably processed to be proportional to the knock signal to control a servo device operating the spark timing for use in Modified borderline and Modified Uniontown knock rating. In octane number requirements work the signal is used to indicate the occurence of knock.

12 Claims, 3 Drawing Figures

METHOD FOR DETERMINING OCTANE RATINGS OF FUELS UNDER ROAD CONDITIONS

SUMMARY OF THE INVENTION

The instant invention relates to a sensitive method for producing a substantially constant indication of engine knock in an internal combustion engine and measuring the octane rating of fuels in automotive engines and an apparatus therefore, and, more specifically, it relates to a method and apparatus for producing a time-averaged-constant indication of knock in an internal combustion engine by suitably processing the electrical output of at least one sensor device contacting said engine during the operation of said engine, normally a controlled acceleration of said engine, and using said suitably processed electrical output to operate a servo mechanism controlling the spark timing in Modified Borderline and Modified Uniontown fuel rating work and thereafter using said spark timing during said controlled acceleration to measure by a comparative method the octane rating of engine fuels under conditions approximating those the average operator would encounter during actual use on the road. The electrical output of the sensor device may also be used to indicate the presence of knock for octane number requirement work.

In accordance with the instant invention as applied to Modified Borderline work, the electrical output from at least one transducer contacting the engine is filtered, amplified and compared continuously during a controlled engine acceleration with an electrical signal proportional to the engine noise, said noise varying with engine speed and load, and the resulting difference signal, proportional to engine knock, is employed to adjust the spark timing using a servo device to keep the engine at a present constant engine knock level throughout the acceleration. Intercomparison of the spark timing for reference and test fuels at a plurality of engine speeds during the controlled acceleration then serves to give octane ratings of markedly improved reproducibility over those obtained by human operators.

In accordance with the instant invention as applied to Modified Uniontown work, the electrical output from at least one transducer contacting the engine is filtered, amplified and compared continuously during a controlled engine acceleration with an electrical signal proportional to the engine noise, said noise varying with engine speed and load, and the resulting difference signal proportional to engine knock is used to provide a calibrated voltage in a peak memory unit corresponding to the distributor set point for the initial Modified Uniontown acceleration. The first Modified Uniontown engine acceleration either knocks or it doesn't. If knock occurs it is compared to the calibrated knock intensity, and if it is equivalent, the spark advance is recorded. If it is not equivalent or if knock does not occur, a staircase generator provides a signal to adjust the spark advance to bring the knock signal into equivalence with the calibrated signal.

In accordance with the instant invention as applied to CRC E-15 Octane Number Requirement work, the electrical output from at least one transducer contacting the engine is filtered, amplified and compared continuously during a controlled engine acceleration with an electrical signal proportional to the engine noise, said noise varying with engine speed and load, and the resulting difference signal proportional to engine knock is compared to a reference voltage so that, when the increasing knock signal equals the reference voltage, engine speed is recorded and when the continuing knock signal decreases again to the reference signal, engine speed is again recorded. These recorded engine speeds are used in the comparison to determine the octane number requirement of the engine.

BACKGROUND OF THE INVENTION

A number of different ways of measuring engine knock have been described among which are those shown in French Pat. No. 2,063,377, British Pat. Nos. 1,185,499, 1,125,991 and U.S. Pat. Nos. 3,247,705 and 3,540,262. However, none of these systems have eliminated the problem of the octane rating determination being influenced by the peculiarities of individual knock raters, and none have effectively combined a fully automated system to measure octane ratings under road conditions. Now it has been found that by using an accelerometer to produce an electrical signal proportional to engine noise plus engine knock and thereafter substantially removing that portion of the signal due to engine noise and using the resulting signal proportional to knock alone, it is possible to measure octane ratings with substantially better reproducibility than can be achieved with human raters. Such a method and device have been shown to yield routinely a reproducible rating of about ±0.5 octane number.

BRIEF DESCRIPTION OF THE DRAWINGS

The three Figures shown are block diagrams for the octane rating devices described below.

STATEMENT OF THE INVENTION

It should be emphasized here that the following elucidation of the preferred embodiments of the invention using the three Figures is meant for descriptive purposes only and not to limit in any say the use of other variants of the method which are within the spirit and scope of the invention. The Modified Borderline Test and The Modified Uniontown Test techniques to which two embodiments of the instant invention are directed are described in CRC Revised Road Rating Techniques (CRC Report No. 436, July 1970) prepared by the Road Rating Techniques Study Panel of the CRC-Motor Road Test Group which report is available from the Coordinating Research Council, Inc., 30 Rockefeller Plaza, New York, N. Y. The CRC E-15 Octane Number Requirement Test technique to which a third embodiment of the instant invention is directed is described in 1971 Octane Number Requirement Survey (CRC Project No. CM-81-71 prepared by the Analysis Panel of the Octane Number Requirement Survey Group and is available from the Coordinating Research Council, Inc.

Figure 1:
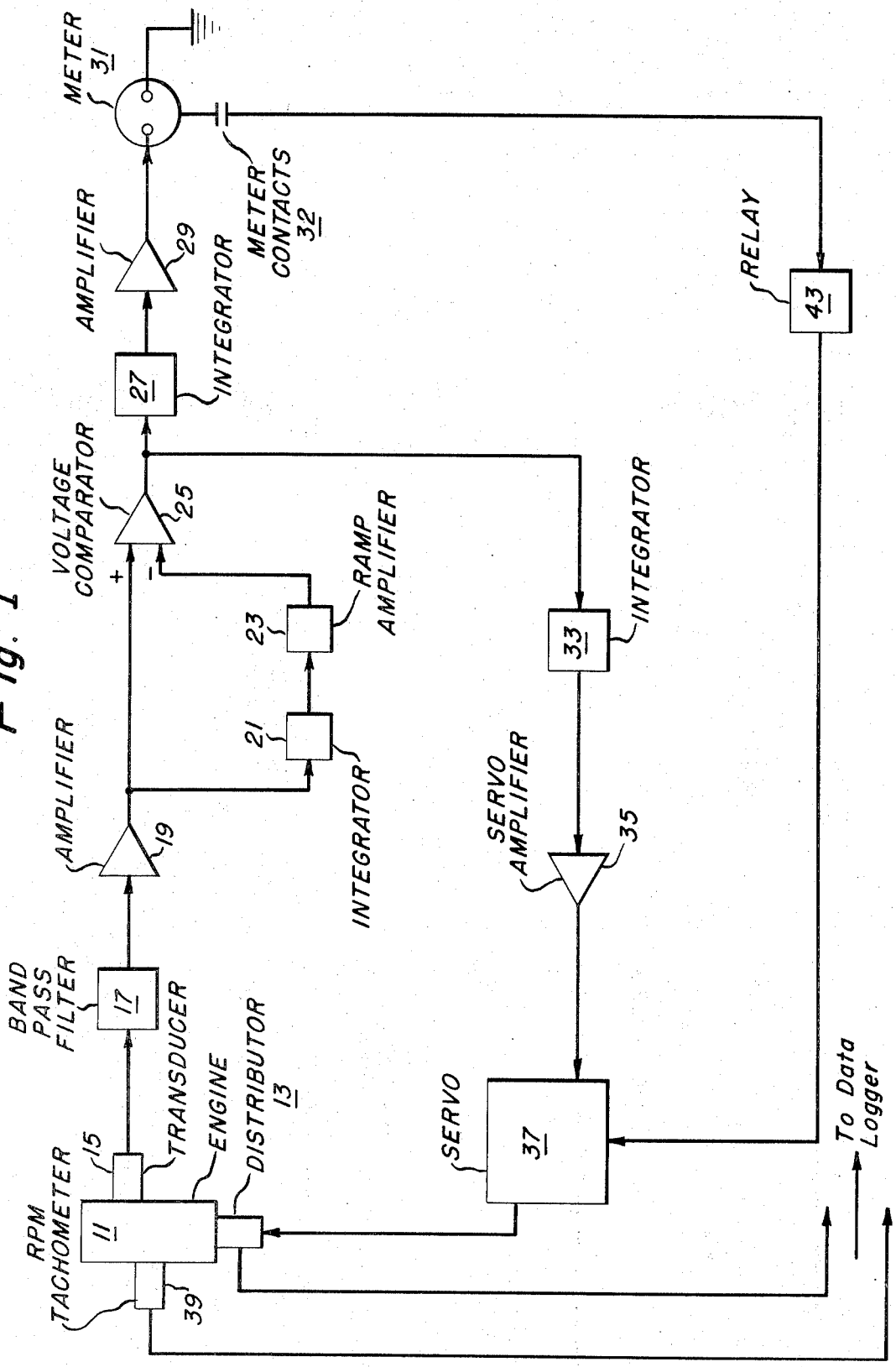
FIG. 1 shows the Modified Borderline system.

Referring to FIG. 1, which is the system for Modified Borderline ratings, it may be seen that a suitable sensing device for engine knock used on engine 11 is a vibration transducer 15. In normal operation one transducer, such as a General Radio high frequency Model 1560-P3 accelerometer, provides sufficient signal to operate the device, and in addition simplifies the method; however, a plurality of such transducers suitably spaced on the engine and with added electronic outputs may be used. Temperature resistant vibration transducers have been selected for use herein as they can be mounted on the engine exterior with no modifications to the engine being required which might change the knock characteristics of the engine. Placement is preferably on the intake manifold of engine 11 instead of being mounted inside a cylinder which either requires a boring operation or specially equipped spark plugs. It is of particular advantage here, to obtain an improved signal to noise ratio, to use a transducer whose electrical output is proportional to the second derivative with respect to time of the amplitude of the engine vibrations and not to the first derivative with respect to time, of the amplitude of the engine vibrations. Such a device is the General Radio accelerometer referred to above.

The electrical output of the transducer 15 is first fed into a band pass filter 17 which eliminates substantially all signal except that in the selected knock band, which is usually in the range of 4 to 8 kilohertz for typical American passenger car engines. The filtered signal from 17 which is proportional to engine noise and knock, if engine knock is present and otherwise only to engine noise, is then fed into amplifier 19 after which the signal is split. Part of the signal goes through integrator 21, and provides a ramp voltage proportional to the time integrated engine noise level. The output of the ramp amplifier 23 is then fed with the output from amplifier 19 into an electronic comparator 25. From the comparator 25 an electrical signal which is now proportional to engine knock alone is taken out and split; part of this signal is fed through integrator 27 and amplifier 29 and read out on the meter 31. The integrator 27 has a sufficiently long time constant to give a reasonably steady readout of knock signal on meter 31. The other part of the split signal from comparator 25 is fed to a shorter time constant integrator 33, an amplifier 35 and the output from amplifier 35 is used to drive a servo 37 which adjusts the engine timing by changing the distributor setting, i.e., changes the point in the cylinder cycle at which the spark plugs fire.

Servo 37 is preferably a multiple speed device which allows rapid or slow adjustment of the engine spark timing drive depending upon whether the engine spark timing is operating close to knock timing or whether it is operating far from it. The shift over between the two servo drive speeds is controlled by relay 43 which is in turn controlled by a limit switch on meter 31. When the meter readout shows a knock signal above a preset value, the relay switches the servo into the lower speed mode so that hunting and overshoot are minimized.

Normally Modified Borderline ratings of fuels are carried out in a chassis dynamometer using simulated road conditions and speeds of between 25 and 75 miles per hour. However, the method and device may be used for measurements on the road as well. The tachometer 39 measures engine speeds; one such as a Model 2217E made by Endeveco, Pasadena, California has been found satisfactory. During the controlled acceleration the engine spark timing position is read out at several predetermined speeds as the knock meter/controller maintains the desired level of knock. These data are collected for reference and for test fuels and then converted to octane ratings by conventional methods well known to those skilled in the art.

Figure 2:
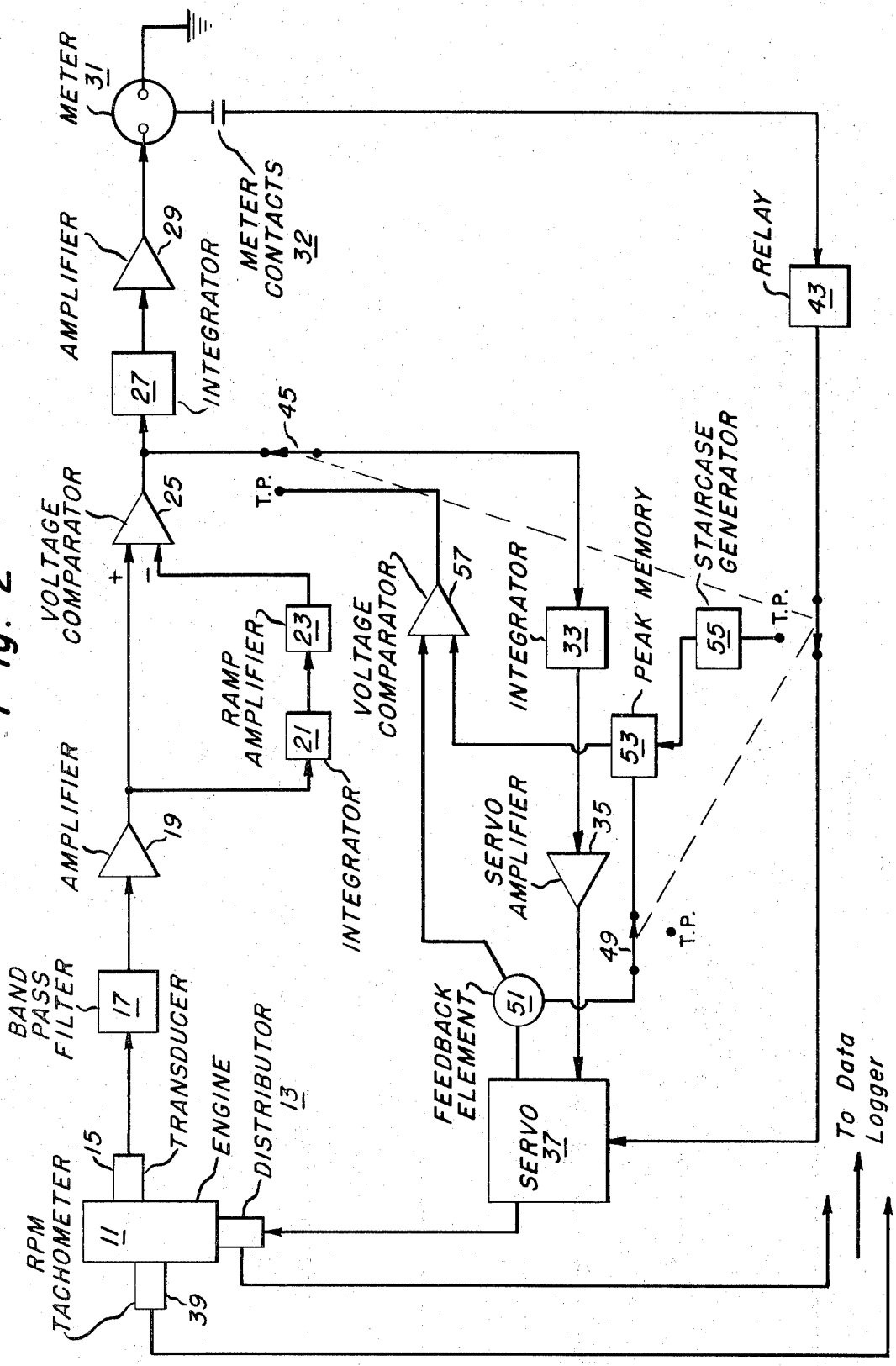
FIG. 2 shows the Modified Uniontown system and FIG. 3 shows the CRC-15 Octane Number Requirement system.

FIG. 2 shows the system for Modified Uniontown ratings. The system is first used in the Modified Borderline mode to make a calibration run to establish the reference level in the peak memory 53. An adjustable unidirectional pot 51 on servo 37 provides a reference signal through switch 49 to peak memory 53. Feedback element 51 also provides a signal to comparator 57. The staircase generator 55 may also feed a signal to peak memory 53 to alter the size of the memorized signal. After the calibration run, gang switches 45, 47 and 49 are placed in the test position and the servo adjusts the spark timing to the position determined in the calibrating run. If knock occurs during the next run and exceeds the preset upper level, contacts 32 or meter 31, operating through relay 43, signals the staircase generator 55 to reduce the reference level in the peak memory 53 so that the spark timing is readjusted for the next run. This continues until a run occurs such that the knock level indicated on meter 31 is equivalent to the level obtained on the calibrated run. If on the first run no knock occurs, the lower level meter contacts 32 signals the staircase generator to increase the reference level in the peak memory 53 so that the spark timing is adjusted opposite to that described previously. This again continues until a run occurs where the knock is equivalent to that of the calibrated run. These spark timing data are collected for reference and for test fuels and then converted to octane ratings by conventional methods well known to those skilled in the art.

Figure 3:
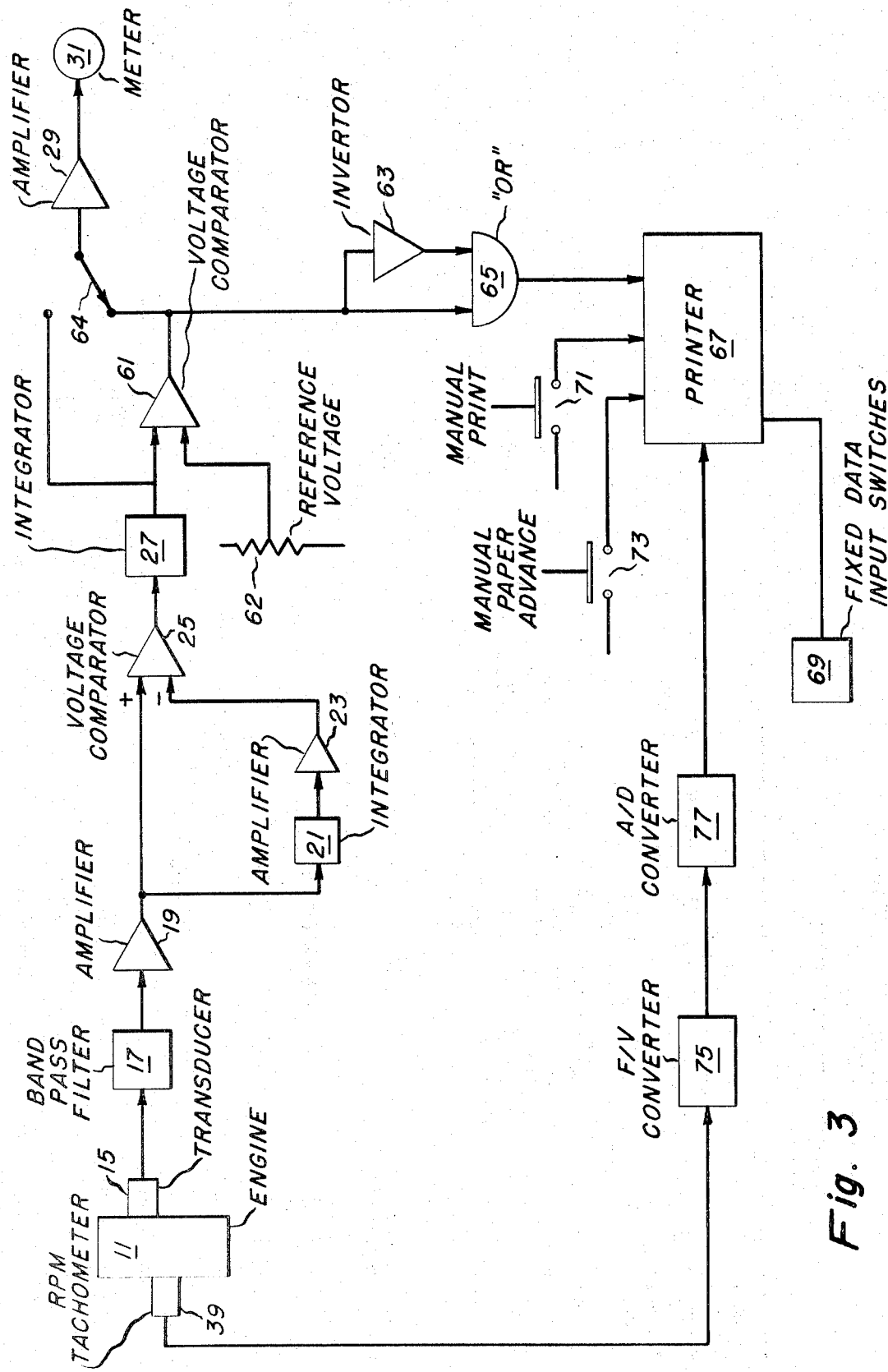

FIG. 3 shows the system for CRC E–15 Octane Number Requirement ratings. The system is first used for a calibration run to set the desired knock level of the system which is usually the faintest knock readily discernible to the human ear. For this, switch 64 is set such that integrator 27 feeds amplifier 29 which feeds meter 31. Switch 64 is then placed in the calibrate position and reference voltage pot 62 is adjusted until meter 31 shows the same deflection for the desired knock level as obtained during the calibration run. Switch 64 is then returned to the normal position. Now the system is ready to do CRC E–15 ratings. If the fuel being used in test produces no knock, there will be no response from the system indicating that a fuel of lower octane quality should be used. If the fuel used produces knock equal to or greater than the preset level for the calibration run, comparator 61 will change the phase of its output voltage when the knock signal equals the preset reference voltage, and this change of phase is detected by the "OR" circuit 65 which receives a direct signal from comparator 61 and an inverted signal through invertor 63. The "OR" circuit 65 then commands the printer 67 to record engine speed and any other desired fixed operating data. This occurs when knock is increasing and decreasing with respect to the desired knock level and thus may occur twice (once for the onset of knock at the so-called "knock in speed" and again for cessation of knock at the so-called "knockout speed") during an acceleration. Engine speed is obtained from tachometer 39 which feeds a frequency to voltage converter 75 which feeds an analog signal to digital converter 77 which feeds printer 67. Fixed operating data are obtained by use of data input switches 69. It is also possible to activate the printer by depressing the manual switch 71 and the recording paper may be advanced by depressing switch 73.

From the engine speed producing a knock signal of a preset value, the octane number requirement of the test engine is obtained by conventional methods well known to those skilled in the art.

What is claimed is:

1. A device for producing a substantially constant knock condition in the presence of engine background noise in an automotive engine over a range of engine speeds which comprises:
    a. generating means coupled to said automotive engine for producing an electrical signal proportional to engine noise and knock noise;
    b. frequency selection means for passing a preselected portion of said electrical signal;
    c. amplification means to increase the amplitude of said preselected portion of said electrical signal;
    d. means for separating out from a portion of the electrical signal resulting from step (c) a second electrical signal which is substantially proportional to the engine noise component present in said electrical signal resulting from step (c);
    e. comparator means for obtaining continuously a difference electrical signal between said electrical signal coming from step (c) and said second electrical signal, said electrical signal coming from step (c) being porportional to engine noise and knock noise and said second electrical signal being substantially proportional to engine noise; and
    f. turning means operated by said continuously obtained difference signal for changing the spark timing of said internal combustion engine so as to maintain continually over said range of engine speeds said substantially constant knock condition.

2. The device of claim 1 wherein said generating means in said accelerometer and said turning means is a servomechanism.

3. The use of the device of claim 2 to measure the octane rating of an engine fuel.

4. The method of producing a knock condition of substantially constant intensity in the presence of engine background noise in an automotive engine over a range of engine speeds which comprises:
    a. using the electrical output of at least one transducer contacting said engine to produce a ramp voltage substantially proportional to said electrical output over said range of engine speeds in the absence of engine knock, and
    b. continuously comparing over said range of engine speeds said ramp voltage with the output of said transducer when engine knock is present, and
    c. continuously using the difference between said ramp voltage and said output of said transducer when engine knock is present to generate an electrical signal substantially proportional to said difference, and
    d. using said electrical signal to continuously adjust the position of the engine timing such that said difference is substantially constant.

5. The method of claim 4 wherein said transducer is an accelerometer.

6. The use of the method of claim 5 to determine the octane rating of an engine fuel.

7. A method of producing a knock level in an automotive engine during a controlled engine acceleration of said engine wherein said knock level is substantially the same as a predetermined knock level comprising:
    a. using the electrical output of at least one transducer in contact with said engine undergoing a controlled acceleration to produce an electrical signal which is substantially proportional to engine knock alone, and
    b. storing said electrical signal in a peak memory unit as said predetermined knock level, and
    c. using the electrical output of at least one transducer in contact with said engine undergoing a controlled acceleration to produce a suitable time-averaged electrical signal substantially proportional to knock alone, and
    d. comparing the knock level of step (c) with said predetermined knock level stored in step (b), and
    e. recording the spark advance position of said engine if the knock level produced in step (c) and step (a) are substantially the same, and
    f. changing the spark advance position of said engine using a staircase generator actuating a servo drive operationg said spark advance if said knock level produced in step (c) is not substantially the same as that produced in step (a), and
    g. carrying out step (c) a plurality of times until the knock level produced in substantially the same as the predetermined knock level stored in step (b).

8. The method of claim 7 wherein said transducer is an accelerometer.

9. The use of the method of claim 8 to determine the octane rating of an engine fuel.

10. A method for collecting engine test data for an automotive engine at a preset knock level in said engine which comprises:
    a. using the electrical output of at least one transducer in contact with said engine to produce a suitably time-averaged electrical signal which is substantially proportional to engine knock alone, and
    b. adjusting the bias of a voltage comparator to be substantially equal to said signal, and
    c. accelerating said engine through a range of engine speeds such that a suitably time-averaged electrical signal substantially proportional to engine knock alone from said transducer which exceeds the bias of said comparator is produced, and
    d. feeding said signal of step (c) in said comparator such that a phase change occurs, and
    e. using said phase change of said comparator to actuate the readout of an engine characteristic at the time said phase change occurs.

11. The method of claim 10 wherein said transducer is an accelerometer.

12. The use of the method of claim 11 to determine the octane number requirement of an automotive engine.

* * * * *